US012331566B2

(12) United States Patent
Peynot et al.

(10) Patent No.: US 12,331,566 B2
(45) Date of Patent: Jun. 17, 2025

(54) VEHICLE DOOR HANDLE ASSEMBLY WITH BACK-UP MECHANISM

(71) Applicant: U-shin Italia S.p.A, Pianezza (IT)

(72) Inventors: Thomas Peynot, Pianezza (IT); Anthony Guerin, Pianezza (IT)

(73) Assignee: U-shin Italia S.p.A, Pianezza (IT)

(*) Notice: Subject to any disclaimer, the term of this patent is extended or adjusted under 35 U.S.C. 154(b) by 129 days.

(21) Appl. No.: 18/173,369

(22) Filed: Feb. 23, 2023

(65) Prior Publication Data

US 2023/0265693 A1 Aug. 24, 2023

(30) Foreign Application Priority Data

Feb. 23, 2022 (EP) .................................... 22158288

(51) Int. Cl.
*E05B 85/10* (2014.01)
*E05B 79/06* (2014.01)

(52) U.S. Cl.
CPC .................................. *E05B 85/107* (2013.01)

(58) Field of Classification Search
CPC ...... E05B 85/10; E05B 85/103; E05B 85/107; Y10S 292/63
See application file for complete search history.

(56) References Cited

U.S. PATENT DOCUMENTS

| | | | | |
|---|---|---|---|---|
| 8,786,401 | B2 * | 7/2014 | Sobecki | E05B 81/34 340/5.1 |
| 10,145,152 | B2 * | 12/2018 | Beck | E05B 17/14 |
| 10,876,327 | B2 * | 12/2020 | Wleklinski, III | E05B 79/06 |
| 2016/0305164 | A1 * | 10/2016 | Bendel | E05B 85/20 |
| 2019/0145134 | A1 * | 5/2019 | Löw | E05B 79/06 70/208 |
| 2021/0285264 | A1 * | 9/2021 | Couto Maquieira | E05B 81/90 |

FOREIGN PATENT DOCUMENTS

| | | | | |
|---|---|---|---|---|
| CN | 110485838 B * | 1/2021 | | E05B 79/06 |
| DE | 102015202185 B3 * | 2/2016 | | B60J 7/1851 |
| DE | 102015008122 A1 * | 12/2016 | | |
| DE | 10 2018 127 805 A1 | 5/2020 | | |
| EP | 3218562 B1 * | 10/2018 | | E05B 79/20 |
| KR | 10-2104888 B1 | 4/2020 | | |

OTHER PUBLICATIONS

Extended European Search Report issued Sep. 22, 2022, in corresponding European Patent Application No. 22158288.5, 12 pages.

* cited by examiner

*Primary Examiner* — Carlos Lugo
(74) *Attorney, Agent, or Firm* — Oblon, McClelland, Maier & Neustadt, L.L.P.

(57) ABSTRACT

A vehicle door handle assembly includes a handle grip that is movable between a flushing position in which it is flush with an exterior door panel surface and a ready position in which it is protruding and graspable by a user. The vehicle door handle assembly also includes a back-up mechanism that includes a flap covering at least partially a cavity arranged inside the handle grip, the flap being movable between a closed position in which it covers the cavity inside the handle grip and an open position in which it permits access to the inside of the cavity, hence allowing a user to insert his fingers or an object inside the cavity and to pull on the handle grip in order to move it from the flushing position to the ready position.

7 Claims, 8 Drawing Sheets

VEHICLE DOOR HANDLE ASSEMBLY WITH BACK-UP MECHANISM

TECHNICAL FIELD

The present invention relates to the field of vehicle door handles, in particular of the type with a flushing door handle grip. Such vehicle door handle assemblies generally comprise an electric motor which, when actuated, moves the handle grip between a flush position in which the handle grip is flush with an exterior door panel surface and a ready position in which said handle grip is protruding and graspable by a user. In the flush position, the handle grip is flush with the exterior surface of the door body. The air drag of the vehicle can consequently be reduced, while the visual aspect of the vehicle can be streamlined. In the ready position, the handle grip is protruding from said exterior surface, so as to be graspable by a user. The user can seize the handle and pull on it in order to unlock and/or open the vehicle door.

BACKGROUND OF THE INVENTION

Such vehicle door handle assemblies generally comprise a back-up mechanism, to enable the opening of the door in case of, for example, electric motor or car battery failure, that is when the electric motor cannot be actuated.

This back-up mechanism comprises for example a push-push mechanism, in which the user pushes the handle grip inwards from its flushing position until reaching a clicking position in which a preloaded spring is released. Said preloaded spring, when released, pushes the handle grip from the inward clicking position in the protruding ready position.

Such a back-up mechanism may comprise an important number of elements, which occupy an important space inside the handle. Consequently, there is a need for a simple, compact architecture of the back-up mechanism for the vehicle door handle that enables a user to easily interact with said handle in case of an electric motor or car battery failure.

SUMMARY OF THE INVENTION

It is therefore a goal of the present invention to overcome at least partially the previous drawbacks of the state of the art and to provide a cost-effective and space-saving solution.

Thus, the present invention refers to a vehicle door handle assembly comprising a handle grip which is movable between a flushing position in which it is flush with an exterior door panel surface and a ready position in which it is protruding and graspable by a user, wherein the vehicle door assembly also comprises a back-up mechanism, said back-up mechanism comprising a flap covering at least partially a cavity arranged inside the handle grip, the flap being movable between a closed position in which it covers the cavity inside the handle grip and an open position in which it permits access to the inside of said cavity, hence allowing a user to insert his fingers or an object inside the cavity and to pull on the handle grip in order to move it from the flushing position into the ready position. The vehicle door handle assembly may present one or more of the following characteristics, taken separately or in combination.

According to a further aspect of the invention, the flap is movable around a pivot axis located on an edge of the cavity arranged inside the handle grip.

According to a further aspect of the invention, the vehicle door handle assembly comprises an elastic return element configured to move the flap from the open position back into the closed position.

According to a further aspect of the invention, the cavity and the flap are located in a middle section of the handle grip.

According to a further aspect of the invention, the flap has a different colour than the handle grip.

According to a further aspect of the invention, at least a portion of the external surface of the flap has a different texture to the touch than the handle grip.

According to a further aspect of the invention, the vehicle door handle assembly comprises a bracket which is linked to the handle grip and the bracket comprises a stopper mechanism for adjusting the position of the handle grip in the flush position.

According to a further aspect of the invention, the stopper mechanism comprises a contact surface that is intended to make contact with a portion of the handle grip in order to adjust the position of the handle grip in the flush position.

According to a further aspect of the invention, the stopper mechanism comprises a housing, an elastic return element and a cap.

According to a further aspect of the invention, the housing and the cap present a geometry of revolution.

In these figures, identical elements have the same reference numbers. An XYZ trihedron is shown in some figures to define the orientation of the handle grip in space. A first direction, noted X, corresponds to a longitudinal direction of the handle grip. A second direction, denoted Y, is directed to the inner side of the vehicle door handle assembly. Finally, a third direction, denoted Z, points towards a general upward direction. The directions, X, Y, Z, are orthogonal to each other.

DETAILED DESCRIPTION OF THE INVENTION

The following achievements are examples. Although the specification refers to one or several embodiments, it does not imply that each reference refers to the same embodiment or that the features apply only to a single embodiment. Simple features of different embodiments can also be combined to provide other embodiments.

In the following description, the terms up, upper, low, lower, vertical, horizontal refer to relative positions or directions when the door handle is assembled to a vehicle. In the description, certain items can be indexed, as the first item or second item. In this case, it is a simple indexing to differentiate and name similar but not identical elements. This indexing does not imply a priority of one element over another and such names can easily be interchanged without going beyond the scope of the present description. Nor does this indexing imply an order in time.

Figure 1:
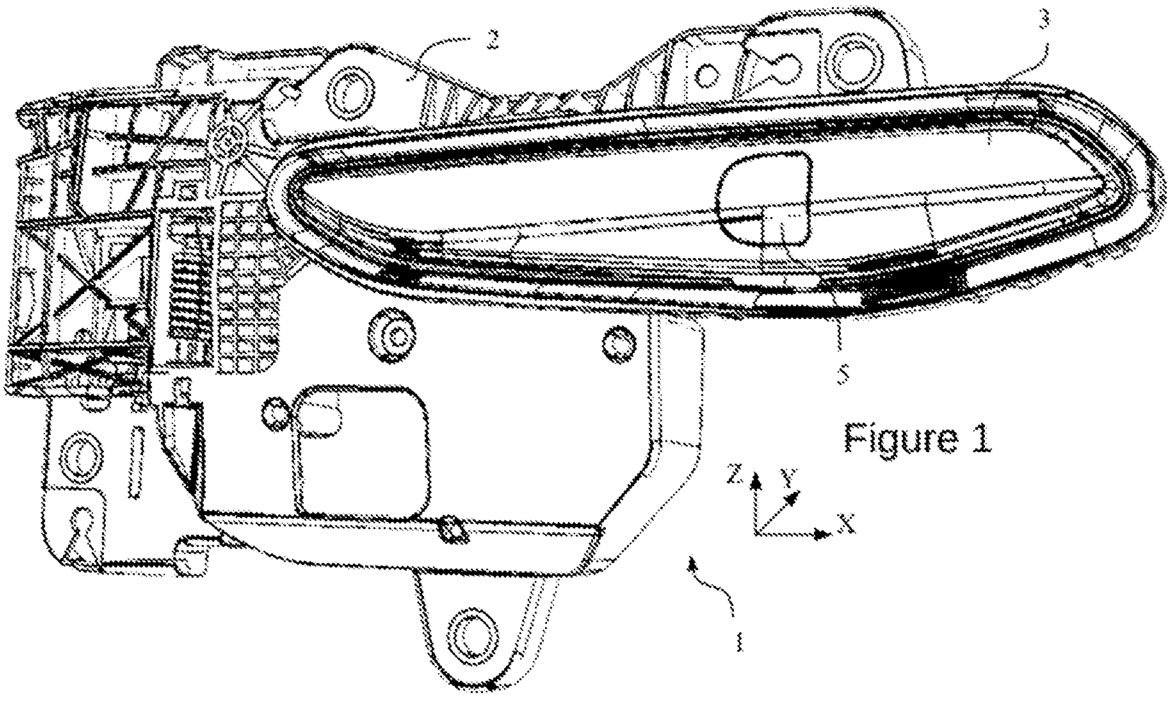
FIG. 1 is a front perspective view of a vehicle door handle assembly.

FIG. 1 shows a vehicle door handle assembly comprising a bracket 2 located on the inner side of the vehicle door and a handle grip 3 which is linked to the bracket 2. The handle grip 3 is in a flushing position in which it is flush with an exterior door panel surface.

The handle grip 3 of the vehicle door handle assembly is also linked to an electric motor (not illustrated) which, when actuated, moves the handle grip 3 between the flush position and a ready position in which the handle grip 3 is protruding and graspable by a user. For instance, the motor can push one end of the handle grip 3 in an outward direction. In that case, the handle grip 3 is moved around a substantially vertical axis. The ready position is not shown in the figures.

Once the handle grip 3 is in the ready position, the user can grasp said handle grip 3 and unlatch the door by pulling it in a further protruding unlocking position, in which the handle grip 3 interacts (via a Bowden cable, a rotating pin or a gear mechanism) with a latch mechanism and unlatches the door.

Figure 2A:
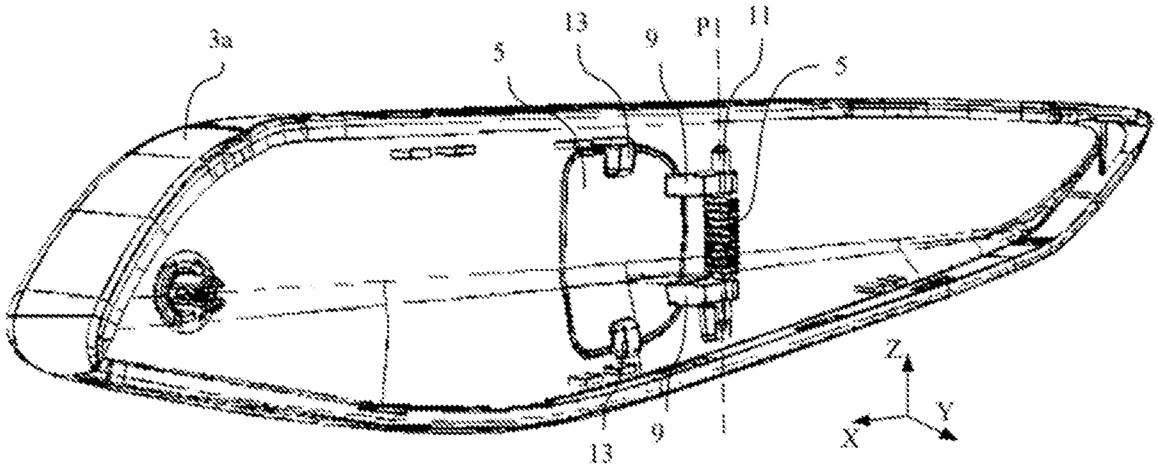
FIG. 2*a* is a back perspective view of the inside of a part of the handle grip of the vehicle door handle assembly from FIG. 1 wherein the flap is in the closed position.
Figure 2B:
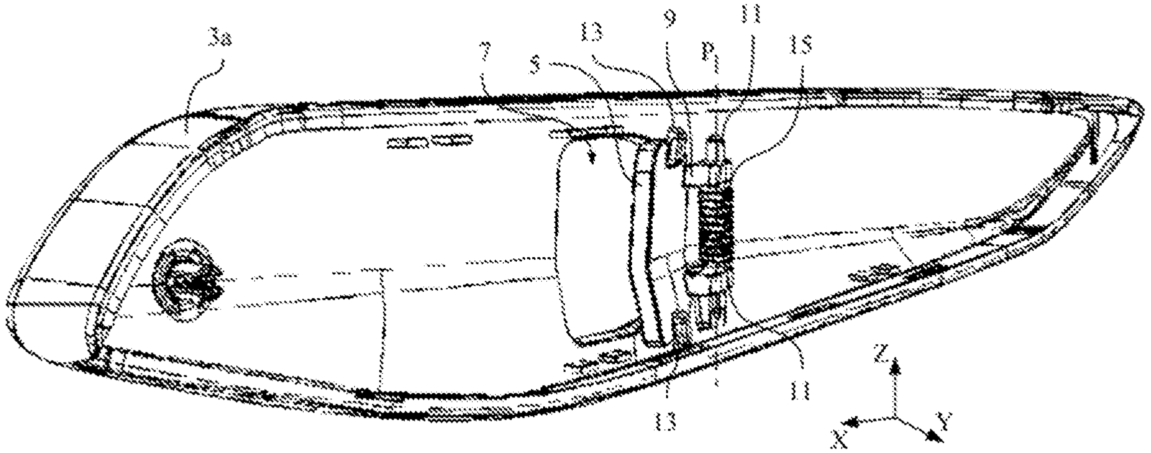
FIG. 2*b* is a similar view to FIG. 2*a*, except that the flap is in the open position.
Figure 5:
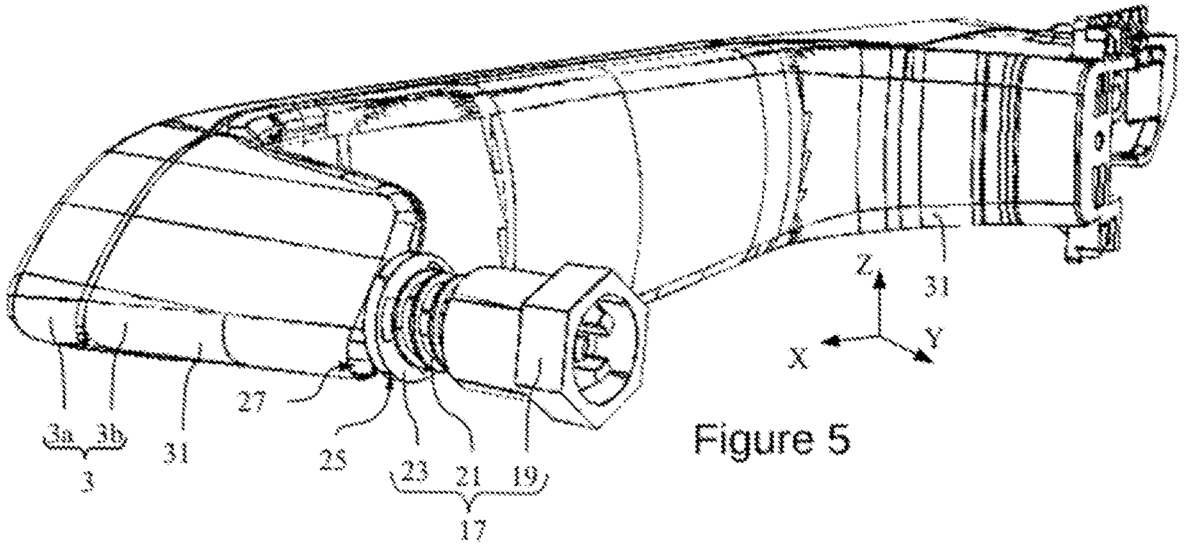
FIG. 5 is a back perspective view of the handle grip and the stopper mechanism.

The handle grip 3 is for example made of two half-shells 3*a*, 3*b* that are assembled together. The assembled handle grip 3 is hence at least partially hollow inside. FIG. 1 shows the exterior surface of the outer shell 3*a* and FIGS. 2*a* and 2*b* show the inner side of this same outer shell 3*a*. An assembled version of the handle grip 3 comprising both the outer shell 3*a* and the inner shell 3*b* is shown in FIG. 5.

The vehicle door handle assembly also comprises a back-up mechanism which enables a user to manually move the handle grip 3 between the flushing position and the ready position in case of an electric failure, such as a battery failure.

This back-up mechanism comprises a flap 5 which covers at least partially a cavity arranged inside the handle grip 3. In the embodiment shown in FIGS. 2*a* and 2*b*, the outer shell 3*a* of the handle grip 3 has a hole 7. Said hole 7 marks the entrance to the cavity arranged inside the handle grip 3.

According to the embodiment illustrated in FIGS. 2*a* and 2*b*, the cavity arranged inside the handle grip 3 and the flap 5 are located in a middle section of the handle grip 3. The cavity and the flap 5 might be located elsewhere, but in the middle section of the handle grip 3 they are easier to spot and easier to use if needed.

The flap 5 is movable between a closed position (FIG. 2*a*) and an open position (FIG. 2*b*). In the embodiment shown in FIG. 2*a*, the flap 5 covers the cavity inside the handle grip 3, meaning that the edges of the flap 5 correspond to the contours of the hole 7. In this same embodiment, the outer surface of the flap 5 is flush with the outer surface of the outer shell 3*a* of the handle grip 3 when the flap is in the closed position.

When the flap 5 is in the open position, it permits access to the inside of the cavity, hence allowing a user to insert his fingers or an object, like a hook or a key for instance, inside the cavity and to pull on the handle grip 3 in order to move it from the flushing position to the ready position. For instance, the user can curl his fingers around an edge of the hole 7 and pull on said edge in order to move the handle grip 3 from the flush position into the ready position in case of an electric failure.

According to another embodiment, a pulling element can be located inside the cavity. A user can pull on this pulling element with his fingers or with an object in order to move the handle grip 3 from the flush position into the ready position.

The flap 5 can be movable around a pivot axis P located on an edge of the cavity arranged inside the handle grip 3, as it is shown in FIGS. 2*a* and 2*b*. This pivot axis P can be parallel to the vertical direction Z. Other directions, like a horizontal direction for instance, can also be considered. As shown in FIGS. 2*a* and 2*b*, the pivot axis P can be located on a side of the hole 7 arranged in the outer half-shell 3*a* of the handle grip 3. The pivot axis P may be parallel to the axis around which the handle grip 3 is rotated by the electric motor when said handle grip 3 is moved from the flush position to a ready position. In order to make the flap 5 more efficient, the pivot axis P is located on the edge of the hole 7 that is the closest to the end of the handle grip 3 that is not being pushed by the electric motor. Such an arrangement of the pivot axes facilitates the movement of the various parts, especially the flap 5 and the handle grip 3, and increases efficiency during handling.

The flap 5 may comprise at least one hinge 9 configured to cooperate with a rod 11 that is aligned with the pivot axis P. In the embodiment illustrated on FIGS. 2*a* and 2*b* for example, the flap 5 comprises two distinct hinges 9.

The flap 5 and the pivot axis P may be arranged in such a way that in order to reach the open position, the flap 5 must be moved inwards. A simple push on the exterior side of the flap can hence be enough to move it from the closed position into the open position. In the open position, the flap 5 is then located inside the cavity of the handle grip 3.

Figure 3:
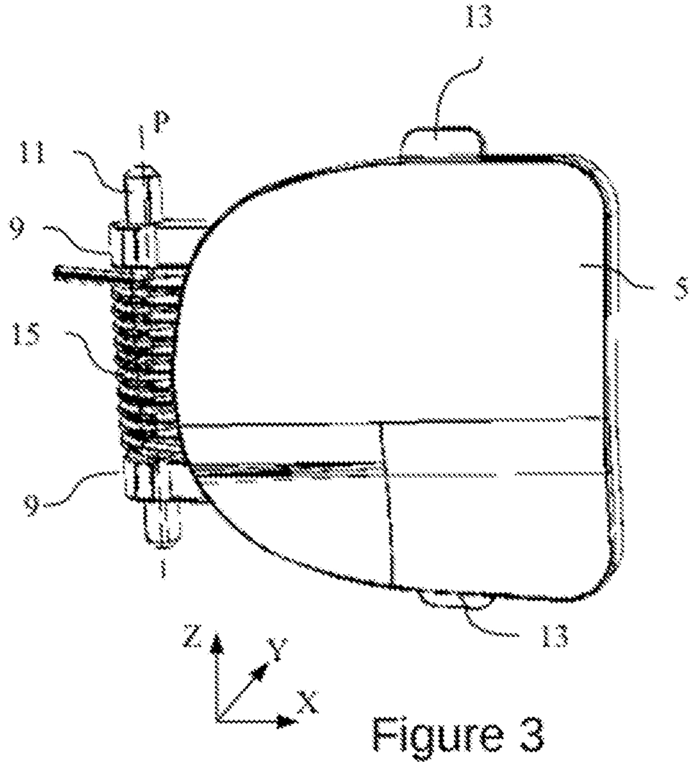
FIG. 3 a front perspective view of the flap from the vehicle door handle assembly.
Figure 4:
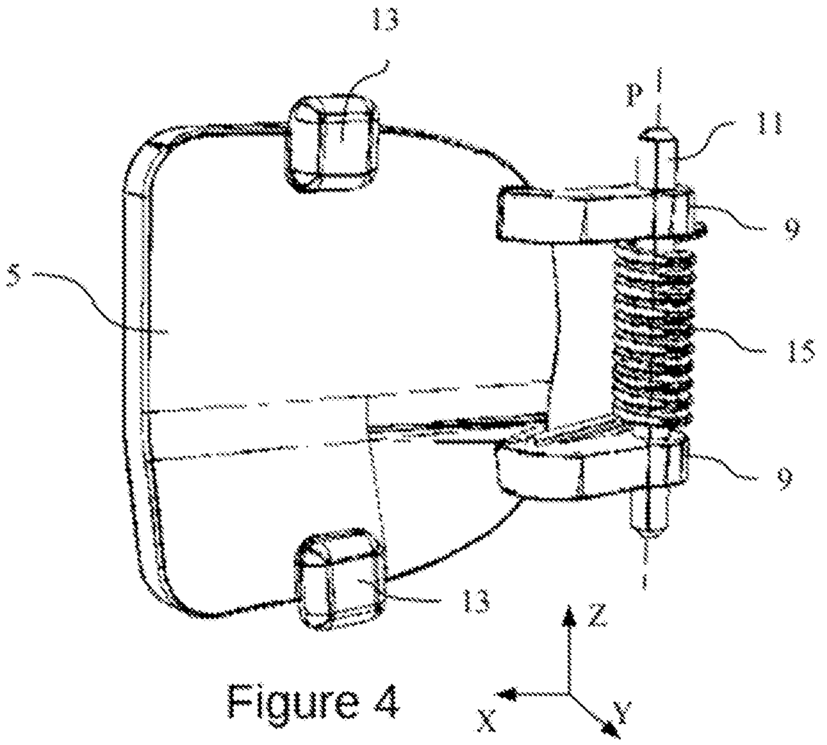
FIG. 4 is a back perspective view of the flap.

According to a preferred embodiment of the flap 5 illustrated in FIGS. 3 and 4, the flap comprises at least one stopper 13 arranged on the inner side of the flap 5. In the embodiment illustrated on FIGS. 2*a*, 2*b*, 3 and 4 for example, two stoppers 13 are arranged on the upper and lower edges of the flap 5. The stoppers 13 are for example located in the middle of said upper and lower edges and project over said edges of the flap 5 so that when the latter is in the closed position, the stoppers 13 rest against the inner surface of the outer shell 3*a* of the handle grip 3. In other words, the stoppers 13 serve to position the flap 5 in its closed position: they prevent the flap 5 from protruding outwards from the handle grip 3.

In FIGS. 3 and 4, the stoppers 13 have a generally square shape, but any other shape is possible for these stoppers 13, such as a rectangular shape, a circular shape or a half-moon shape.

In an embodiment not shown, the flap 5 may comprise a single stopper 13 located, for example, in the middle of the edge opposite the edge equipped with the hinge or hinges 9.

According to a different embodiment (not shown in the figures), the flap 5 and the pivot axis P around which the flap 5 rotates can be arranged in such a way that the flap 5 protrudes from the outside surface of the outer shell 3*a* of the handle grip 3 when the flap 5 is in the open position. In this particular embodiment, the flap 5 may be used as an additional pulling element for moving the handle grip 3 from the flush position into the ready position. In this particular embodiment, the flap 5 does not comprise the stoppers 13 described earlier.

The back-up mechanism can also comprise an elastic return element 15 configured to move the flap 5 from the open position back into the closed position. According to the embodiment illustrated in FIGS. 2*a*, 2*b*, 3 and 4, the elastic return element 15 is a helical spring with coils that are arranged around the rod 11 that is aligned with the pivot axis P. More specifically, the helical spring can be located between the two hinges 9 of the flap 5.

For example, one end of the elastic return element 15 is attached to the flap 5 while the other end of the elastic return element 15 is attached to another part of the vehicle door handle assembly. Such an elastic return element 15 ensures that the flap 5 is moved back into the closed position even if the user makes little effort to put the flap 5 back in the original position after it has served its purpose. The elastic return element 15 also ensures that the flap 5 doesn't move freely when the car is used (acceleration, turns, shifts, slope change, . . . ).

According to a specific embodiment, the flap 5 can have a different colour than the handle grip 3, making it easier to spot when searching for the cavity said flap 5 covers. For example, the handle grip 3 can have a light colour and the flap 5 a dark colour, or vice-versa.

Moreover, at least a portion of the external surface of the flap 5 can have a different texture to the touch than the handle grip 3. For example, the handle grip 3 can have a smooth surface while at least a portion of the external surface of the flap 5 can have a rough surface. This way the flap 5 can be easily found by touch and used even in the absence of light, by night for example. In another non-illustrated embodiment, the contour of the flap 5 may be illuminated to enable it to be delineated from the rest of the handle grip 3 in the absence of light, by night for example.

According to another embodiment (not shown in the figures), the flap 5 can be slid from the closed position in which it covers the cavity inside the handle grip 3 into the open position in which it gives access to the cavity. In this particular embodiment, the flap is not pivoted around an axis, but slid sideways in a translational movement along the longitudinal direction of the handle grip 3, for example.

After multiple use of the handle grip 3 and/or the back-up mechanism, it might happen that in the flush position, the handle grip 3 is not flush with the door panel any more. In other words; alignment errors may occur over time, which may result in the handle grip 3 protruding a bit from the exterior surface of the door panel. This can lead to an unaesthetic arrangement and a less effective streamline. In order to prevent such a disruption of the position of the handle grip 3, the bracket 2 of the vehicle door handle assembly 1 can be equipped with a stopper mechanism 17 for adjusting the position of the handle grip 3 in the flush position after it has been used.

In addition, the stopper mechanism 17 can also be used to adjust the flush position of the handle grip 3 even when the handle grip 3 is new or first installed. The mechanism can enable the flush position by itself or be a solution to compensate for a deviation as described.

The stopper mechanism 17 does this by making contact with a specific portion of the handle grip 3 whenever the latter is moved back into the flush position. For instance, the inner half-shell 3*b* of the handle grip 3 can comprise a bent portion 31 on each of its longitudinal endings, such as illustrated in FIG. 5. These bent portions 31 are usually used to guide the handle grip 3 in translation when it is moved from the flush position into the ready position. Here however, one of the bent portions of the inner half-shell 3*b* of the handle grip 3 also serves another purpose.

The tip 27 of said bent portion 31 comes into contact with a surface of the stopper mechanism 17 in order to repeatedly adjust the position of the handle grip 3 in the flush position, as shown in FIG. 5. The stopper mechanism 17 helps to adjust an exact and reliable position of the handle grip 3 every time it is moved back into the flush position.

Figure 6:
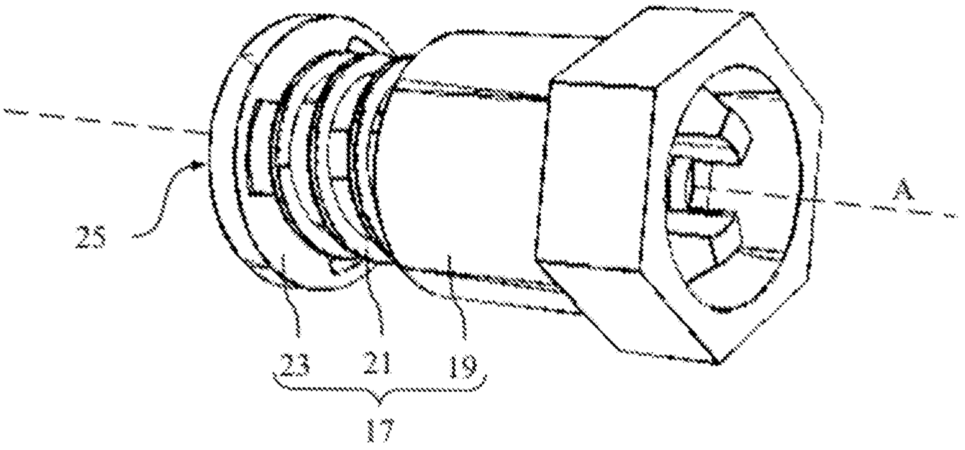
FIG. 6 is a detailed view of the stopper mechanism.
Figure 7:
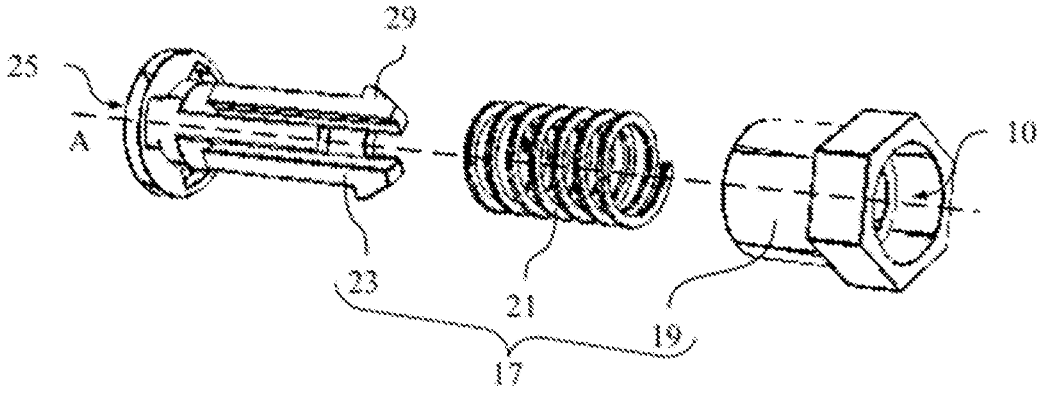
FIG. 7 is an exploded view of the stopper mechanism from FIG. 6.

According to one embodiment of the stopper mechanism 17 illustrated in FIGS. 5, 6 and 7, the stopper mechanism 17 comprises a housing 19, an elastic return element 21 and a cap 23. It's the cap 23 that comes into contact with the tip 27 of the bent portion 31 of the inner half-shell 3*b* of the handle grip 3. The housing 19, the elastic return element 21 and the cap 23 are stacked on top of each other along an assembly axis A shown in FIG. 6. When assembled, at least a portion of the elastic return element 21 is located inside the housing 19 and at least a portion of the cap 23 is also arranged inside the housing 19. A portion of the elastic return element 21 can peak out of the housing 19, as shown in FIG. 6.

The cap 23 has a mostly longitudinal shape. One end of the cap 23 comprises a flat surface 25 that is shaped like a disk. This disk-shaped flat surface 25 is intended to make contact with the tip 27 of the bent portion of the inner half-shell 3*a* of the handle grip 3 in order to adjust the flush position of said handle grip 3.

The housing 19 can have a geometry of revolution and present for instance an overall cylindrical shape. In particular, the inside of the housing 19 can present an overall cylindrical shape. The end of the housing 19 located on the opposite side of the disk-shaped flat surface 25 of the cap 23 may comprise a hexagonal-shaped head, as shown in FIGS. 5 and 6. With this specific embodiment of the housing 19, the relative position of the stopper mechanism 17 with respect to the tip 27 of the bent portion 31 of the inner half-shell 3*a* of the handle grip 3 can be adjusted by screwing said housing 19 along the assembly axis A, thereby moving the stopper mechanism 17 along said axis. Because the flat surface 25 of the cap 23 is disk-shaped, a change in angular placement of the stopper mechanism 17 about the axis A does not affect the flatness of the contact surface between the flat surface 25 of the cap 23 and the tip 27 of the bent portion 31 of the handle grip 3. This reinforces the reliability of the stopper mechanism 17 when it comes to repeatedly positioning the handle grip 3 in the flush position.

The elastic return element 21 can have the form of a helical spring that is arranged inside the cylindrical opening of the housing 19. The elastic return element 21 is rigid enough to withstand the force that will be received from the handle grip 3 when the latter is being moved. In the embodiment where the elastic return element 21 is formed like helical spring, part of the coils of this elastic return element 21 can be arranged around the rod-shaped middle section of the cap 23.

The tip of this rod-shaped middle section can comprise an enlarged section 29 configured to retain the spring coils of the elastic return element 21 around said middle section. When assembled, the enlarged section 29 of the rod-shaped middle section of the cap 23 is stored inside the cylindrical opening of the housing 19.

Unlike a back-up mechanism comprising a push-push mechanism in which all the parts are interconnect, the flap 5 and the stopper mechanism 17 can work independently of each other. In case one of these features is deficient, it is possible to replace only the deficient part without having to replace the entire back-up mechanism.

It is therefore possible to provide a simple, compact and cost-effective architecture of the back-up mechanism for a vehicle door handle assembly that enables a user to easily interact with said handle in case of an electric motor or car battery failure.

The invention claimed is:

1. A vehicle door handle assembly comprising:

a handle grip which is movable between a flush position, in which the handle grip is flush with an exterior door panel surface, and a ready position in which the handle grip is protruding and graspable by a user;

a back-up mechanism comprising a flap covering at least partially a cavity arranged inside the handle grip, the flap being movable between a closed position in which the flap covers the cavity inside the handle grip and an open position in which the flap permits access to the inside of said cavity, to allow a finger of the user or an object to be inserted inside the cavity and to pull on the handle grip in order to move the handle grip from the flush position to the ready position;

a bracket which is linked to the handle grip, the bracket comprising a stopper mechanism configured to adjust the position of the handle grip in the flush position, wherein the stopper mechanism comprises a contact surface that is configured to make contact with a portion of the handle grip in order to adjust the position of the handle grip in the flush position.

2. The vehicle door handle assembly according to claim 1, wherein the stopper mechanism comprises a housing, an elastic return element, and a cap.

3. The vehicle door handle assembly according to claim 2, wherein the housing and the cap have a geometry of revolution.

4. The vehicle door handle assembly according to claim 1, further comprising an elastic return element configured to move the flap from the open position back into the closed position.

5. The vehicle door handle assembly according to claim 1, wherein the cavity and the flap are located in a middle section of the handle grip.

6. The vehicle door handle assembly according to claim 1, wherein the flap has a different color than the handle grip.

7. The vehicle door handle assembly according to claim 1, wherein at least a portion of an external surface of the flap has a different texture than the handle grip.

* * * * *